United States Patent
Klumpp et al.

(10) Patent No.: US 10,253,920 B2
(45) Date of Patent: Apr. 9, 2019

(54) PROFILE FOR A CYLINDRICAL COMPONENT

(71) Applicant: Dr. Ing. h.c.F. Porsche Aktiengesellschaft, Stuttgart (DE)

(72) Inventors: Holger Klumpp, Moensheim (DE); Sammy El Daibani, Feusdorf (DE); Mike Roehr, Weissach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/672,170

(22) Filed: Nov. 8, 2012

(65) Prior Publication Data

US 2013/0149474 A1 Jun. 13, 2013

Related U.S. Application Data

(60) Provisional application No. 61/568,432, filed on Dec. 8, 2011.

(30) Foreign Application Priority Data

Dec. 8, 2011 (DE) .................. 10 2011 055 516

(51) Int. Cl.
| | |
|---|---|
| *F16M 1/026* | (2006.01) |
| *F02F 1/00* | (2006.01) |
| *F16J 10/04* | (2006.01) |
| *B23P 9/00* | (2006.01) |
| *F16J 15/08* | (2006.01) |

(52) U.S. Cl.
CPC .............. *F16M 1/026* (2013.01); *F02F 1/00* (2013.01); *F02F 1/004* (2013.01); *F16J 10/04* (2013.01); *B23P 9/00* (2013.01); *F05C 2253/12* (2013.01); *F16J 2015/0856* (2013.01); *Y10T 428/13* (2015.01)

(58) Field of Classification Search
CPC .. F16M 1/026; C23C 4/02; B23P 9/00; Y10T 428/13
USPC ............. 428/34.1, 156; 72/324; 83/851, 875
See application file for complete search history.

(56) References Cited

U.S. PATENT DOCUMENTS

| | | | |
|---|---|---|---|
| 2010/0031799 A1 | 2/2010 | Ast et al. | |
| 2010/0326270 A1 | 12/2010 | Doerfler et al. | |

FOREIGN PATENT DOCUMENTS

| | | |
|---|---|---|
| DE | 10 2008 058 452 | 2/2010 |
| DE | 10 2009 027 200 | 4/2011 |
| DE | 10 2010 052 735 | 11/2011 |

*Primary Examiner* — Brian Handville
(74) *Attorney, Agent, or Firm* — Gerald E. Hespos; Michael J. Porco; Matthew T. Hespos

(57) ABSTRACT

A cylindrical component has a groove bottom (4) that extends approximately parallel to the course of the unworked surface of the component, and has a side wall (6, 7) inclined at an angle ($\alpha$) of less than 90° to the groove bottom (4). To increase the adhesion between a coating to be applied to the surface of the component an upper region of the side wall (6, 7) is adjoined by an oblique surface (8, 9) at an angle ($\psi$) of greater than 90° to the side wall.

4 Claims, 1 Drawing Sheet

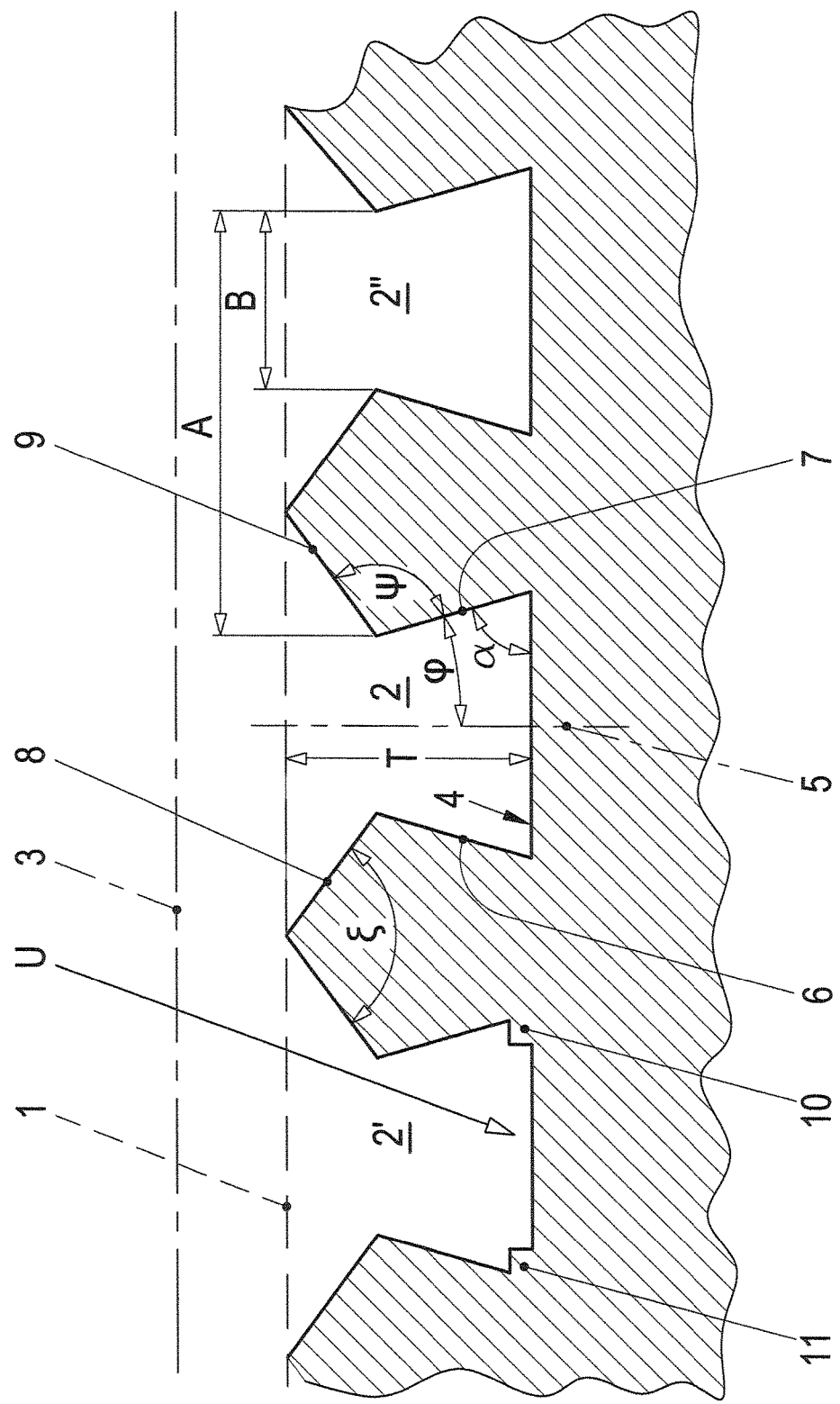

PROFILE FOR A CYLINDRICAL COMPONENT

CROSS REFERENCE TO RELATED APPLICATIONS

This application claims priority under 35 USC 119 to German Patent Appl. No. 10 2011 055 516.1 filed on Nov. 18, 2011 and U.S. Provisional Patent Appl. No. 61/568,432 filed on Dec. 8, 2011, the entire disclosure of which is incorporated herein by reference.

BACKGROUND OF THE INVENTION

1. Field of the Invention

The invention relates to a profile for a groove that is introduced into the surface of a preferably cylindrical component.

2. Description of the Related Art

Grooves in a surface of a cylindrical component are known to have various geometries to improve the retention of coatings applied to the surface of the cylindrical component.

DE 10 2008 058 452 A1, for example, shows a profile for a groove introduced into the surface in a cylinder liner by a progressive tool prior to a thermal coating process. The profile of the groove has a bottom that is approximately parallel to the course of the surface to be worked and inwardly slanting, concavely formed side walls to provide a dovetail-like profile that achieves good adhesion between the layer and the surface with the groove.

It is an object of the invention to improve the adhesion between the layer and the surface to be coated.

SUMMARY OF THE INVENTION

The invention relates to a groove with a profile configured so that particles of a coating pass reliably into the profile, completely fill the groove and increase adhesion. The profile has a groove bottom that extends approximately parallel to the course of the surface of the component to be worked. A side wall extends from the groove bottom and is inclined at an angle of less than 90° to the groove bottom. An upper region of the side wall merges into an oblique surface that is set at an angle of greater than 90° to the side wall. As a result, a widened profile opening is produced, so that particles can pass better into the profile. In addition, the inclined surface is a suitable deflection surface, so that particles that strike the inclined surface are deflected appropriately.

A step may be provided between the groove bottom and the side wall to relieve the stress on the tool.

Advantageous embodiments are explained in more detail in the following text with reference to the drawing.

BRIEF DESCRIPTION OF THE DRAWING

FIG. 1 is a section view of a surface provided with a profile according to the invention in a greatly enlarged illustration.

DETAILED DESCRIPTION OF THE PREFERRED EMBODIMENT

The surface illustrated in FIG. 1 can be for example a cylindrical inner surface of a bore in a cylinder crankcase Z. In the unworked state, i.e. before the introduction of the groove, the dashed line indicated with the reference numeral 1 represents the inner surface of the unworked bore. A groove having the profile 2 according to the invention is incorporated incrementally by a suitable tool into the inner surface as a helix, the central axis of which is designated with the reference numeral 3. The spiral-shape enables plural profiles 2, 2', 2" to be produced next to one another at a constant spacing A.

Each profile 2 is symmetrical and has a groove bottom 4 that extends approximately parallel to the inner surface 1. The axis of symmetry is indicated by the reference numeral 5. Side walls 6 and 7 extend from the groove bottom 4 in an inclined manner toward the axis of symmetry 5. Each side wall 6 or 7 extends at an acute angle α to the groove bottom 4. Upper regions of the side walls 6 or 7 are adjoined by inclined surfaces 8 or 9 at angles ψ that are greater than 90°. Thus, a roof-like elevation having an angle which is greater than 90° is produced between the profiles 2 and 2', and 2 and 2", respectively.

As a result, the narrowest point of the profile 2 has the width B widened in a funnel-shaped manner in the direction of the interior of the bore. Thus, particles that strike in a perpendicular manner, for example during the thermal coating operation, can be deflected as per arrow U to the groove bottom of the profile.

In a further embodiment, a step 10 or 11 for relieving stress on the tool can be provided, as illustrated for the sake of clarity only at the profile 2', between the groove bottom 4 and the side wall 6 or 7, respectively.

The profile described represents only one embodiment of the claimed solution. Thus, an asymmetrical profile also is conceivable.

What is claimed is:

1. A cylindrical component having an inner cylindrical surface formed around a central axis and a helical groove formed in the cylindrical inner surface, the groove having a profile that consists of: a groove bottom that extends substantially parallel to the surface of the component into which the groove is formed, the groove bottom having opposite first and second lateral ends, first and second side surfaces aligned at an angle (α) of less than 90° to the groove bottom, first and second oblique surfaces extending out from the respective first and second side surfaces at angles (ψ) to the side surfaces greater than 90° so that the oblique surfaces converge continuously toward one another at positions farther from the central axis, and first and second steps between the respective first and second lateral ends of the groove bottom and the respective first and second side surfaces, the steps being closer than the groove bottom to the oblique surfaces and a distance between the first and second steps being less than a distance between the locations on the side surfaces closest to the groove bottom, wherein the steps relieve stress on a tool that forms the groove and wherein the converging oblique surfaces cause particles that strike the oblique surfaces to be guided to the groove bottom, and wherein the helical groove comprises plural groove sections that are next to one another at a constant spacing in a direction parallel to the central axis, the oblique surfaces of the groove sections that are next to one another in the direction parallel to the central axis intersecting and meeting one another at a convex angle of intersection (ξ) that is greater than 90° and that is free of concavities facing toward the central axis so that particles striking the oblique surfaces are guided to the groove bottom.

2. The component of claim 1, wherein dimensions of the oblique surfaces in directions normal to the intersection of the oblique surfaces are equal at all positions on the respective groove profiles.

3. A cylindrical component having an inner cylindrical surface formed around a central axis and a helical groove formed in the cylindrical inner surface, the groove having a profile that consists of: a groove bottom that extends substantially parallel to the surface of the component into which the groove is formed, the groove bottom having opposite first and second lateral ends, first and second side surfaces aligned at an angle ($\alpha$) of less than 90° to the groove bottom, first and second oblique surfaces extending out from the respective first and second side surfaces at angles ($\psi$) to the side surfaces greater than 90° so that the oblique surfaces converge continuously toward one another at positions farther from the central axis, the helical groove having plural groove sections that are next to one another at a constant spacing in a direction parallel to the central axis, the oblique surfaces of the groove sections that are next to one another in the direction parallel to the central axis intersecting and meeting one another at a convex angle of intersection ($\xi$) that is greater than 90° and that is free of concavities facing toward the central axis, wherein the converging oblique surfaces cause particles that strike the oblique surfaces to be guided to the groove bottom.

4. The component of claim 3, wherein dimensions of the obliques surfaces in directions normal to the intersection of the oblique surfaces are equal at all positions on the respective oblique surfaces.

\* \* \* \* \*